US008479183B2

(12) United States Patent
Hsieh et al.

(10) Patent No.: US 8,479,183 B2
(45) Date of Patent: *Jul. 2, 2013

(54) CACHING RUN-TIME VARIABLES IN OPTIMIZED CODE

(75) Inventors: Cheng-Hsueh A. Hsieh, San Jose, CA (US); Lei Jin, Beijing (CN); Liping Gao, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 921 days.

This patent is subject to a terminal disclaimer.

(21) Appl. No.: 12/588,652

(22) Filed: Oct. 22, 2009

(65) Prior Publication Data

US 2010/0050163 A1 Feb. 25, 2010

Related U.S. Application Data

(63) Continuation of application No. 10/977,527, filed on Oct. 29, 2004, now Pat. No. 7,624,388.

(30) Foreign Application Priority Data

Apr. 30, 2004 (WO) ................ PCT/CN2004/000441

(51) Int. Cl.
*G06F 9/45* (2006.01)
(52) U.S. Cl.
USPC ............................ 717/154; 717/131; 717/159
(58) Field of Classification Search
USPC .................................. 717/124–133, 151–161
See application file for complete search history.

(56) References Cited

U.S. PATENT DOCUMENTS

| 6,072,952 A | 6/2000 | Janakiraman |
| 6,090,155 A | 7/2000 | Donovan et al. |
| 7,624,388 B2 * | 11/2009 | Hsieh et al. ................... 717/154 |

FOREIGN PATENT DOCUMENTS

| JP | 9319615 | 12/1997 |
| JP | 10240564 | 9/1998 |
| JP | 2000029740 | 12/1999 |
| WO | WO 01/73549 | 10/2001 |

OTHER PUBLICATIONS

Healy, "Automatic Utilization of Constraints for Timing Analysis", 1999, The Florida State University, College of Arts and Sciences, thesis, pp. i-x, 1-111.*
Bowman et al., "Decreasing Process Memory Requirements by Overlapping Program Portions", 1998, IEEE, pp. 1-10.*
Intel, "Microengine Version 2 (MeV2): Microengine C Compling Coding Consideration," Jun. 2003, Intel Corporation, Version 0.4, 30 pages.
Chi et al., "Unified Management of Registers and Cache Using Liveness and Cache Bypass," 1989, ACM, pp. 344-355.
Coutant et al., "DOC: A Practical Approach to Source-Level Debugging of Global Optimized Code," 1988, Hewlett-Packard, pp. 125-134.

(Continued)

*Primary Examiner* — Ted T Vo (57) ABSTRACT

In one embodiment, the present invention includes a method for emitting a live range statement into a program for a memory variable to be cached during run-time that has at least one simulation state variable if the memory variable is dynamically mapped, and defining the simulation state variable at a first execution path of the program. In such manner, the program may be optimized using the live range statement and the simulation state variable. Also, a debugger may use the simulation state variables in obtaining and displaying the memory variable from a cache.

19 Claims, 4 Drawing Sheets

OTHER PUBLICATIONS

Tice et al., "Optview: A New Approach for Examining Optimized Code," ACM SIGPLAN/SIGSOFT Workshop on Program Analysis for Software Tools and Engineering (PASTE '98), Montreal, Canada (Jun. 16, 1998). ACMS SIGPLAN Notices, vol. 33, No. 7, Jul. 1998, pp. 19-27.

Adl-Tabatabai et al., "Source-Level Debugging of Scalar Optimized Code," ACM SIGPLAN Symp. on Programming Language Design and Implementation, May 1996, pp. 33-43.

Adiletta et al., "The Next Generation of Intel IXP Network Processors," Intel Technology Journal: Network Processors, vol. 6, issue 3, Aug. 15, 2002, pp. 9-16. http://developer.intel.com/technology/itj/2002/volume06issue03/vol6iss3_networkprocessors.pdf.

"Advanced Software Development Tools for Intel IXP2XXX Network Processors," Intel Corporation White Papers, Oct. 2003, pp. 1-13. http://www.intel.com/design/network/papers/25413901.pdf.

"Intel Internet Exchange Architecture (Intel IXA) Software Development Kit 3.1," Intel Corporation Product Brief., 2003, pp. 1-4.

Jaramillo, "Source Level Debugging Techniques and Tools for Optimized Code," Thesis, University of Pittsburgh, pp. i-xiv, 1-125, 2000.

* cited by examiner

CACHING RUN-TIME VARIABLES IN OPTIMIZED CODE

This is a Continuation of application Ser. No. 10/977,527 filed Oct. 29, 2004, which in turn is a National Phase of Application No. PCT/CN/2004/000441, filed Apr. 30, 2004. The disclosure of the prior application is hereby incorporated by reference herein in its entirety.

BACKGROUND

The present invention relates to software and more particularly to software for use in compilers and debuggers. Debugging optimized code presents a challenge to both a compiler and debugger alike. A compiler is a computer program that converts code in a source language into code of a target language (often in optimized form), while a debugger is a program used to aid in the design and development of target code.

During compilation, code may be reordered and/or duplicated beyond recognition, and data may be stored at different locations or even be folded and/or removed. A typical compiler optimization is to cache memory operands in registers such that high latency memory accesses can be avoided. For example, a compiler can load a loop-invariant non-volatile memory variable in a loop pre-header, access a processor register in place of the variable, and then store it back to memory upon loop exit.

If the offset of such cached portion of a variable is constant and the mapping to registers is known at compile-time, the compiler can generate one or more live ranges for a debugger to show up-to-date "data which" information fetched from the correct locations. A "live range" is a time and place during execution of a program at which a given variable is located. When a user adds a data watch on a variable X, a debugger must fetch the data from the correct location(s) depending on the current program count (PC) value, otherwise stale data in memory may be presented and confuse the user.

However, generation of live ranges does not work if a variable offset is not constant or one or more registers to which a variable is cached is not known at compile-time. In this case, it is difficult or impossible for a compiler to generate code to access the cached data efficiently and write it back to memory when the offset and/or mapping are unknown. A need thus exists to efficiently look up a non-constant offset and map a variable to a cache.

BRIEF SUMMARY

A method and system is disclosed that is capable of efficiently looking up a variable with a non-constant offset and mapped in cache. The method can include compiling a live range statement into an optimized program. The live range statement corresponds to a memory variable that can be stored and dynamically mapped in cache during run-time of the optimized program. This live range statement may have at least one simulation state variable that is defined to point to a location storing a memory address of the cached memory variable. Additionally, the live range statement, with the simulation state variable, can be used to further optimize a program, including compiling into the program code to query a content addressable memory to determine whether the memory variable is present in cache at a given time.

DETAILED DESCRIPTION

Figure 1:
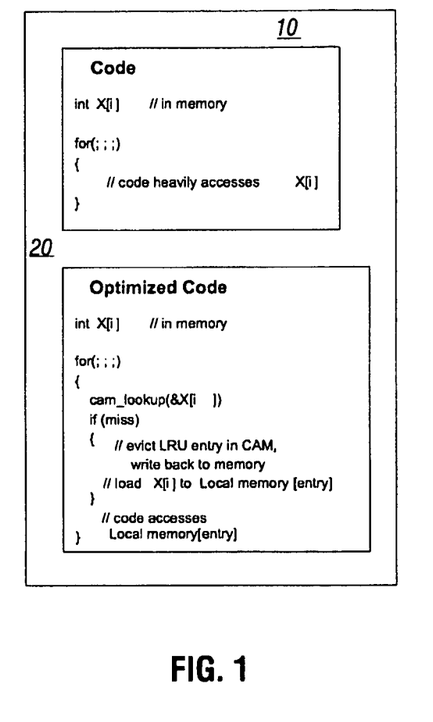
FIG. 1 is a code segment and an optimized version of the code segment in accordance with an embodiment of the present invention.

Referring now to FIG. 1, shown is a code segment 10 and optimized code segment 20 in accordance with an embodiment of the present invention. Code segment 10 declares that an integer type is returned for any entry X[i] in an array with a variable offset, which is present in system memory. Thus, during a loop of code segment 10 that heavily accesses this variable X[i] (e.g., the hypothetical "for" loop of code segment 10) high latency accesses to system memory are required, causing poor performance of the code segment.

Still referring to FIG. 1, an optimized code segment 20 may be formed using a complier to optimize the code of code segment 10 to access the variable from a cache memory, thus reducing access time and improving performance. Optimized code segment 20 includes code inserted by a complier to more efficiently obtain and access X[i] from such a cache memory. While many implementations may be used, FIG. 1 shows an embodiment in which the code is to be executed on a processor including a content addressable memory (CAM) and additional local memory (LM) that may act as a cache for heavily accessed data, such as a variable X[i]. However, it is to be understood that the scope of the present invention is not so limited, and other code implementations may be used for execution on a processor having different cache memory structures.

Generally, optimized code segment 20 includes code to determine whether the desired entry X[i] in an array with a variable offset is present in a cache memory associated with the processor. If it is, accesses to the variable are obtained from the cache memory. If not, the data is obtained from system memory and stored in cache so that future accesses may be obtained from the cache.

More specifically, optimized code segment 20 causes a lookup of entries in the CAM to determine whether a hit occurs. If so, this indicates the desired variable is already stored in cache memory. Alternately, if a miss occurs, this indicates that the desired variable is not stored in cache, and a routine is performed to evict the least recently used entry of the CAM and an associated portion of the cache memory, and then the desired variable is loaded into cache memory and the CAM entry is updated accordingly. In certain embodiments, if the evicted portion of the cache memory is dirty, the dirty data may be written back to system memory. Then, the variable may be obtained from the cache memory.

Figure 2:
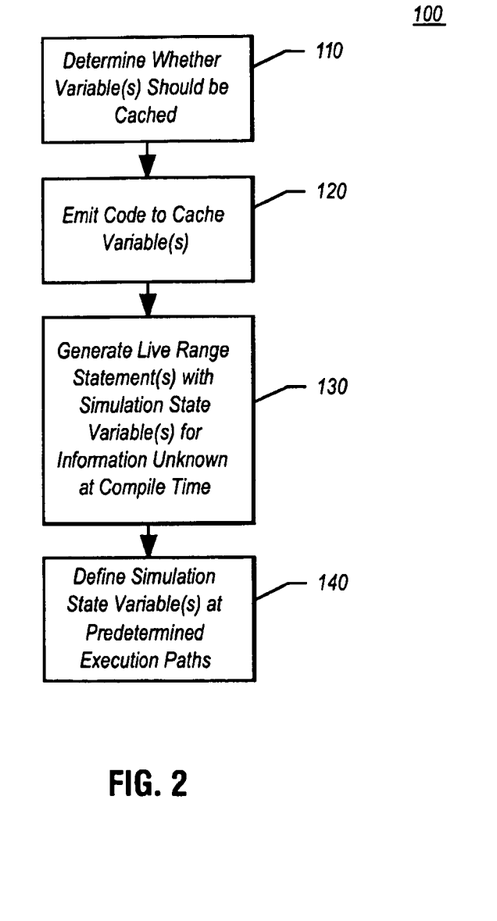
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be performed by a compiler during optimization of a program. Method 100 may begin by determining the suitability of caching one or more variables in a cache memory associated with a processor (block 110). For example, a compiler may examine a code portion of a program to determine whether the portion heavily accesses one or more memory variables. If it does, the compiler may cache such variables in cache memory. To do so, the compiler may optimize the code portion to cause the processor to store and access the variables from cache memory (block 120). For example, a program segment may be optimized in a manner similar to that shown above in FIG. 1 as optimized code segment 20.

While such code optimizations may improve program efficiency, by changing the structure of the code, debugging operations may be negatively affected. Accordingly, in certain embodiments, the compiler may emit additional code to enable a debugger to obtain and display variables from appropriate memory locations. Thus in the embodiment shown in FIG. 2, method 100 may generate one or more live range statements with simulation state variables (SSVs) for information only available during run-time (block 130). That is, for debugging information unknown at compile time, such as offset and register definitions, the compiler may generate simulation state variables corresponding to the unknown information.

Next, the compiler may define the simulation state variables at predetermined execution paths (block 140). For example, the compiler may define the simulation state variables at given locations in the program code (i.e., at a given PC value) based on the operations occurring thereat. In such manner, optimized code in accordance with an embodiment of the present invention may include optimized code for storing and accessing heavily used variables from cache memory, as well as defining and creating live range statements for debugging information unknown at compile-time. In certain embodiments, additional code may not be generated in a simulated execution environment. Instead, in such embodiments, a compiler may emit a directive for a debugger to simulate SSVs.

Thus information unknown at compile-time may be obtained and provided to a user during debugging by use of an algorithm in accordance with an embodiment of the present invention. Shown below in Table 1 is an algorithm in accordance with one embodiment of the present invention, in which several cache memories associated with a processor may be used to more efficiently obtain and store data and information, both during debugging and program execution. Specifically, the algorithm of Table 1 may be used in a processor having a content addressable memory (CAM) and a separate local (i.e., cache) memory.

TABLE 1

```
d = CAM_lookup(&X[i]));
hit = d<7:7>          // bit-7 of lookup result indicates a hit (=1) or
                      miss(=0)
entry_num = d<6:3>;   // bits 6-3 contain an entry number (entry_num)
if (!hit)
{
    // entry_num is the least-recently-used (LRU) entry in CAM:
    Write back local memory (LM) entry corresponding to entry_num, if
    necessary;
    Load X[i] into LM address corresponding to entry_num; and
    Update tag in CAM entry_num
}
else
{
    // entry_num is a matching entry
}
Use LM corresponding to entry_num in place of X[i] for future accesses.
Later, write back all cached entries, if necessary
```

Code corresponding to the algorithm of Table 1 may be emitted by a compiler during compilation into code segments where one or more variable (e.g., X[i]) is heavily accessed. In the above example, the compiler emits code that uses local memory (LM) with much lower latency compared to conventional memory (i.e., system memory) to cache accesses to memory variable X[i] (where i is a run-time variable). Thus, the compiler generated code performs a lookup to an address of a cached copy in the LM by the CAM_lookup statement, which finishes in one processor cycle. Each CAM entry may correspond to a dedicated chunk of space in the LM. For example, in the embodiment of Table 1, a CAM may have 16 entries, such that a four-bit entry number may uniquely identify a portion of the LM. Thus, in the algorithm of Table 1, the four-bit entry number may correspond to a particular section of LM.

If the lookup misses (i.e., if bit 7 of the lookup result is a logic zero), the compiler generated code writes back the chunk associated with the LRU entry, if necessary, to system memory, and then loads X[i] into that chunk and updates the CAM entry accordingly (i.e., setting bit seven to a logic one).

Figure 3:
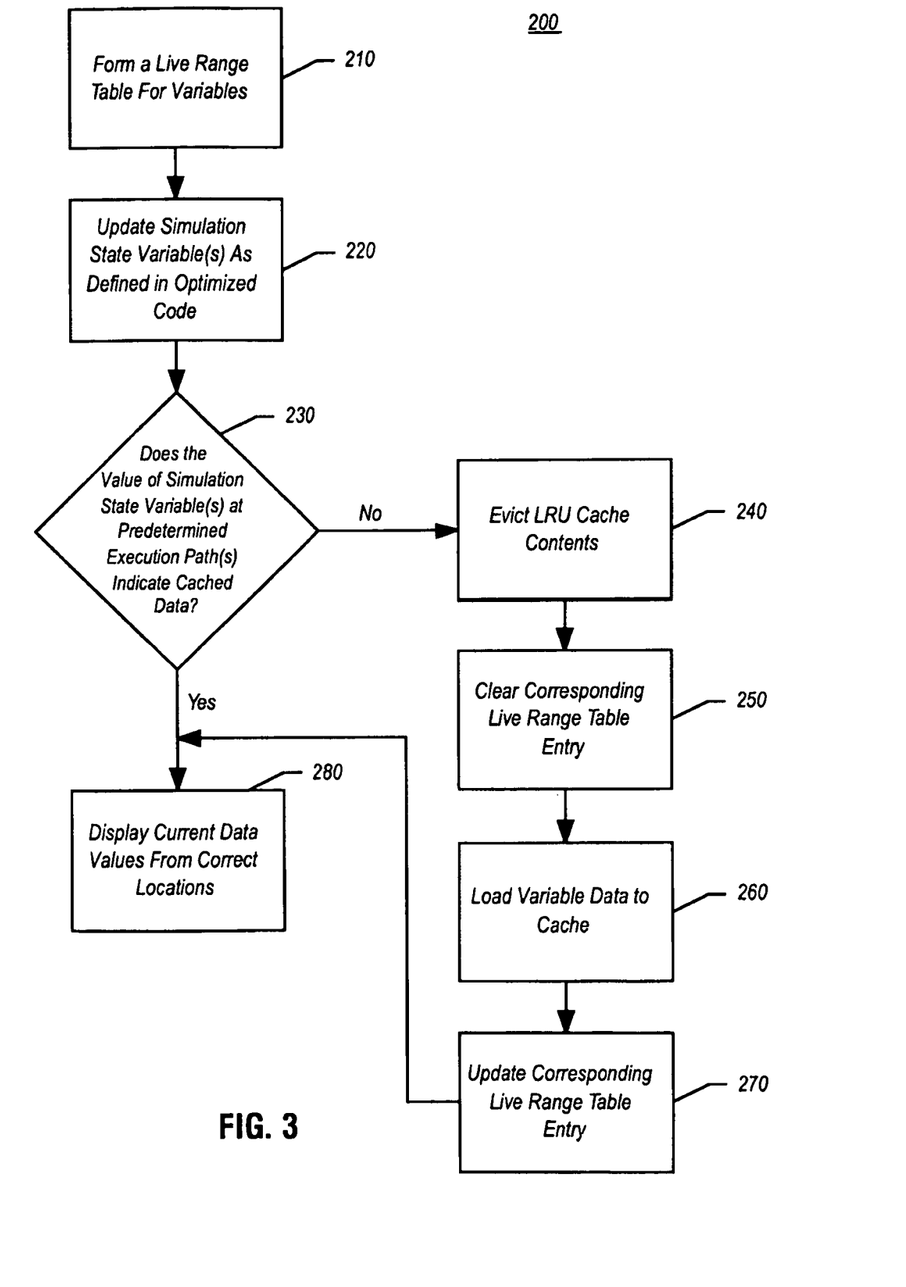
FIG. 3 is a flow diagram of a debugging method in accordance with an embodiment of the present invention.

Referring now to FIG. 3, shown is a flow diagram of a debugging method in accordance with an embodiment of the present invention. As shown in FIG. 3, method 200 begins by forming a live range table for variables (block 210). In one embodiment, such a live range table may be maintained for each variable of a program. The live range table may include SSVs used to predicate the cached variables.

Still referring to FIG. 3, SSVs may be updated as defined in the optimized code (block 220). For example, a given SSV may be defined to be a certain value at different execution paths (e.g., at different PC values). Next it may be determined whether the value of the SSV at these predetermined execution paths indicates the presence of cached data (diamond 230). If not, it means the variable is not present in local memory. Accordingly, a least recently used cache contents may be evicted (block 240). In certain embodiments, if the contents contain dirty data, the data may be written back to system memory. Also, a live range table entry corresponding to the evicted cache portion may be cleared (block 250). Then the variable data may be loaded to that cache portion from system memory (block 260). Finally, the corresponding live range table entry may be updated accordingly (block 270).

As a result of these measures, the desired variable is now located in cache memory. Accordingly, the debugger may display the current data values from the correct locations (block 280).

Thus for debugging information unknown at compile-time, such as offset and register number, a compiler may emit one or more predicated expressions, each including one or more simulation state variables (SSVs), which may be predicated by an instruction address (i.e., PC) of "lookup" and "write back" operations. The compiler may also emit information about how the SSVs are to be defined (e.g., variable offset and mapping) at certain execution paths. Thus an optimized program may include compiler generated code to control local storage of run-time variables using one or more SSVs.

In certain embodiments, a debugger may use the information to evaluate and use SSVs during debugging. In such manner, a set of live ranges for cached variables may be obtained and up-to-date data may be fetched from correct locations, and presented to a user. For example, in one embodiment, a debugger may present the information in a graphical user interface (GUI), for example, a data watch window.

Referring now to Table 2, shown is an example code segment that may be emitted by a compiler in accordance with one embodiment of the present invention. Table 2 will be discussed in connection with Table 3 below.

TABLE 2

| | |
|---|---|
| 11: a0 ← &X | // a0 = address of array X |
| 12: b3 ← i | // b3 = index i |
| 13: b7 ← a0 + (b3 << 2) | // b7 = address of array X[i], assuming a 32-bit integer |
| 14: cam_lookup[a4, b7] | // a4 contains result of lookup: a4<7:7> = hit/miss, a4<6:3> = CAM entry number |
| 15: br_bset[a4, 7, L1] | // branch to loop at L1 below if a hit |
| 16: ... ... ... | // evict LRU entry at a4<6:3>, write back LM contents, if necessary |
| 26: ... ... ... | // load X[i] into LM chunk associated with entry |
| 36: cam_write[a4<6:3>, b7] | // evict LRU by updating tag of CAM entry with address of X[i] in LM |
| L1: | |
| 41: <<< ... access LM associated with entry a4<6:3> instead of X[i] in system memory ... >>> | |
| <<< ... ... ... >>> | |
| L9: | |
| 91: <<< ... write back LM to system memory if necessary, assuming a6 is entry number in a loop ... >>> | |
| 96: a6 ← CAM entry number | // a6 is CAM entry number in a loop to write back all cached entries |
| 98: ... ... ... | // write back LM associated with entry |

In such an embodiment, the compiler may also generate debugging information concerning a plurality of SSVs. Referring now to Table 3, shown is example code emitted by a compiler to implement SSVs.

TABLE 3

.%var X size=8-byte
.%liverange offset=0; size=8-byte; at memory addr=0x2000; PC=3:1000
.%liverange offset=$S1$*4; size=4-byte; at LM[$S2$*4]; PC=11:98; predicate=$SF$@16,26,98; handle=$H$
.%ssv $S1$ = b3@12
.%ssv $S2$ = a4<6:3>@14
.%ssv $H$ = $S2$@14
.%ssv $H$ = a6@96
.%ssv $SF$ = a4<7:7>@14
.%ssv $SF$ = 1@26
.%ssv $SF$ = 0@91

In the above example code of Table 3, an 8-byte variable X is normally located in system memory beginning at address 0x2000 when the PC is in the range of 3 to 1000, according to the first .% live range statement. The 4-byte quantity at an offset of four, however, will be cached in LM indexed by a4<6:3> if the current PC is in the range of 11 to 98, which may be PC values associated with a loop body. The second .% live range entry is an addendum (and thus takes priority) and sets forth that a set of 4-byte quantities from offsets $S1$*4 of X will exist at LM with an offset of $S2$*4, predicated by $SF$ sampled at PCs 16, 26 and 98. In this embodiment, it may be assumed that all SSVs including $H$, $S1$, $S2$, and $SF$ are 32-bit signed integers.

The simulation state variables set forth at the following .% ssv lines of Table 3 specify how their values are defined at the given PC. For each .% live range entry containing a SSV, a debugger may maintain a live range table including a set of n-tuples to record the handle and to determine the whereabouts of (part of) array variable X.

In the example of Table 3, the debugger maintains a set of 3-tuple (h, s1, s2), where h, s1 and s2 are instances of SSVs $H$, $S1$ and $S2$, respectively. When an instruction at one of PC 16, 26 or 98 finishes execution, the debugger may add a 3-tuple ($H, $S1$, $S2) to the set if $SF$ is non-zero (that is, a matching CAM entry exists), or remove the 3-tuple with a matching handle $H from the set if $SF$ is zero (that is, no matching CAM entry exists). Thus, the debugger may update the set of SSVs at PC(s) specified, and any .% live range entry containing at least one SSV specifies a set of offset/mapping determined at run-time which take precedence over lines without such SSVs.

In the example code of Table 2, if the CAM lookup performed at PC 14 misses, $SF$ becomes zero (in accordance with the .% SSV lines of Table 3) and the branch at PC 15 will fall-through. Then at PC 16 (et seq.) a LM region associated with the LRU entry is evicted. Also a set containing a 3-tuple with a matching handle of $H$ (which is the CAM entry number corresponding to the LRU entry), if it exists, may be removed from the set. As shown in Table 3, $SF$ becomes 1 at PC 26 when X[i] is cached into LM. There, the debugger may create a 3-tuple ($H, $S1$, $S2) and place it in the set. On the other hand, if the CAM lookup at PC 14 hits, the set is not updated, as neither PC 16 or 26 will be executed (as the branch to L1 (i.e., PC 41) at PC 15 occurs).

Starting from PC 91, when the code decides to write back all cached entries to system memory, $SF$ becomes 0 and $H$ is the entry number. All 3-tuples in the live range table will be removed one after the other in the loop as they are written back to system memory.

In another embodiment, a compiler may decide to cache a pointer in either X[i] or Y[j] using, the above technique, which may be applied as shown in Table 4 below:

TABLE 4

| | |
|---|---|
| 06: a0 ← &X | // a0 = address of array X |
| 07: a10 ← &Y | // a10 = address of array Y |
| 08: b3 ← i | // b3 = index i |
| 09: b13 ← j | // b13 = index j |
| 10: b7 ← a0 + (b3 << 2) | // b7 = address of array X[i], assuming a 32-bit integer |
| 11: b17 ← a10 + (b13 << 2) | // b17 = address of array Y[j], assuming a 32-bit |

TABLE 4-continued

```
integer
    12: beq[a22, L0]              // a22 decides X[i] (=0) or Y[j] (!=0)
    13: b7 ← b17                  //b7 = address of Y[j]
L0:
    14: cam_lookup[a4, b7]        // a4 contains result of lookup: a4<7:7> = hit/miss,
a4<6:3> = CAM entry number
    15: br_bset[a4, 7, L1]        // branch to loop at L1 below if a hit
    16: ... ... ...               // evict LRU entry at a4<6:3>, write back to LM
contents if necessary
    26: ... ... ...               // load X[i] or Y[j] into LM chunk associated with
entry
    36: cam_write[a4<6:3>, b7]    // evict LRU by updating tag of CAM entry with
address of X[i] or Y[j]
L1:
    41: <<< ... access LM associated with entry a4<6:3> instead of X[i] or Y[j] in
system memory ... >>>
        <<< ... ... ... >>>
L9:
    91: <<< ... write back LM to system memory if necessary, assuming a6 is entry
number in a loop ... >>>
    96: a6 ← CAM entry number     // a6 is CAM entry number in a loop to write
back all cached entries
    98: ... ... ...               // write back LM associated to entry a6
```

In such an embodiment the compiler may emit the following code of Table 5 to implement SSVs.

TABLE 5

```
.%var X size=8-byte
    .%liverange offset=0; size=8-byte; at memory addr=0x2000;
PC=3:1000
    .%liverange offset=$S1$*4; size=4-byte; at LM[$S2$*4]; PC=6:98;
predicate=$SFa$@16,26,98; handle=$H$
.%var Y size=8-byte
    .%liverange offset=0; size=8-byte; at memory addr=0x2008;
PC=3:1000
    .%liverange offset=$S11$*4; size=4-byte; at LM[$S2$*4]; PC=6:98;
predicate=$SFb$@16,26,98; handle=$H$
    .%ssv $S1$ = b3@8
    .%ssv $S11$ = b13@9
    .%ssv $S2$ = a4<6:3>@14
    .%ssv $H$ = $S2$@14
    .%ssv $H$ = a6@96
    .%ssv $SF$ = a4<7:7>@14
    .%ssv $SF$ = 1@26
    .%ssv $SF$ = 0@91
    .%ssv $Sa$ = 1@12
    .%ssv $Sa$ = 0@13
    .%ssv $Sb$ = !$Sa$@13
    .%ssv $SFa$ = ($SF$ && $Sa$)@14,26,91
    .%ssv $SFb$ = ($SF$ && $Sb$)@14,26,91
```

If a compiler uses more than one CAM to lookup the address of cached data, the handle number computation may be shifted to make each handle unique, e.g., "handle=$H$" may define the first CAM, and "handle=$H$+16" may define the second CAM, assuming the first CAM has 16 entries.

Thus, where cached quantities are in the form of variable-address+offset, a compiler may perform as follows to generate debugging information to assist a debugger in tracking and evaluating the SSVs for user-defined variables.

First, at the place where a cached variable has a variable offset or mapping unknown at compile time, the compiler may emit additional ".% live range" lines with an expression including an SSV for unknown part(s) predicated by the instruction address of "lookup" and "write back" operations. Then the compiler may emit ".% ssv" lines for SSV(s) that define the variable offset and mapping. Note that if the cached quantities come from more than one variable, additional SSVs may be emitted on execution path(s) which lead to the determination of the variable eventually cached, to assist the predicate expressions.

Thus in various embodiments, such as may be implemented in a software development kit, a debugger may watch correct data contents stay in cache locations for a significant period time, and thus a developer will not see stale data in memory. By using embodiments of the present invention, a compiler may more aggressively optimize code, while still allowing the optimized code to be debugged.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions. For example, the instructions may be implemented in both a compiler and a debugger to enable an optimized program to accurately access and display variables stored in cache memory.

Figure 4:
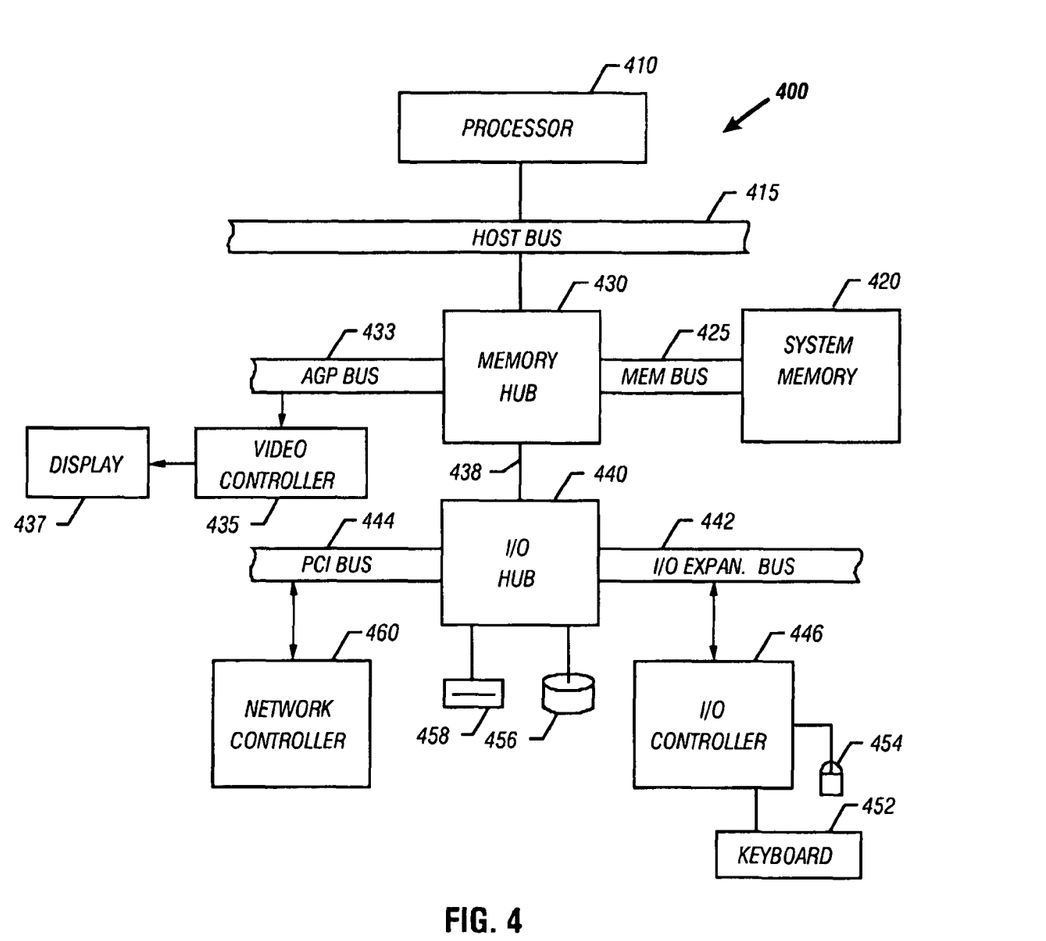
FIG. 4 is a block diagram of a computer system with which embodiments of the invention may be used.

Example embodiments may be implemented in software for execution by a suitable system configured with a suitable combination of hardware devices. FIG. 4 is a block diagram of system 400 with which embodiments of the invention may be used.

Now referring to FIG. 4, in one embodiment, system 400 includes a processor 410, which may include a general-purpose or special-purpose processor such as a microprocessor, microcontroller, a programmable gate array (PGA), and the like. As used herein, the term "system" may refer to any type of processor-based system, such as a desktop computer, a server computer, a network appliance or the like.

In an embodiment for use in debugging programs for a network appliance including a network processor, a compiler and debugger may include instructions to cause certain variables to be stored in local memories, as managed by CAM entries. In one such embodiment, a network processor may include a plurality of microengines to perform data operations. Each microengine may include its own local memory and at least one CAM having multiple entries. The CAM may have 16 entries, in one embodiment, and each entry may be used to store a value representing a dedicated chunk of the local memory. Thus a source operand may be compared to each of the 16 entries in a single instruction in parallel. The outcome of the comparison may yield two outcomes, namely an indication of a hit or miss, indicating whether the lookup value is present in the CAM. In addition to the state, the result also may provide the entry number of either the least recently used entry (i.e., on a miss) or the entry holding the lookup value (i.e., on a hit). Such an entry number may be used as an index to data in the local memory associated with the given LM chunk. While discussed as enabling lookups to a CAM associated with a processor, it is to be understood that other embodiments may be used to cache and obtain access to local variables in a cache memory and processor lacking such a CAM.

The processor 410 may be coupled over a host bus 415 to a memory hub 430 in one embodiment, which may be coupled to a system memory 420 which may be dynamic RAM (DRAM), such as a double data rate (DDR) memory, via a memory bus 425. The memory hub 430 may also be coupled over an Advanced Graphics Port (AGP) bus 433 to a video controller 435, which may be coupled to a display 437. The AGP bus 433 may conform to the Accelerated Graphics Port Interface Specification, Revision 2.0, published May 4, 1998, by Intel Corporation, Santa Clara, Calif.

The memory hub 430 may also be coupled (via a hub link 438) to an input/output (I/O) hub 440 that is coupled to a input/output (I/O) expansion bus 442 and a Peripheral Component Interconnect (PCI) bus 444, as defined by the PCI Local Bus Specification, Production Version, Revision 2.1 dated June 1995. The I/O expansion bus 442 may be coupled to an I/O controller 446 that controls access to one or more I/O devices. As shown in FIG. 4, these devices may include in one embodiment storage devices and input devices, such as keyboard 452 and mouse 454. The I/O hub 440 may also be coupled to, for example, a hard disk drive 456 and a compact disc (CD) drive 458, as shown in FIG. 4. It is to be understood that other storage media may also be included in the system.

The PCI bus 444 may also be coupled to various components including, for example, a network controller 460 that is coupled to a network port (not shown). Additional devices may be coupled to the I/O expansion bus 442 and the PCI bus 444, such as an input/output control circuit coupled to a parallel port, serial port, a non-volatile memory, and the like. Although the description makes reference to specific components of the system 400, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented compiler optimization method for generating an optimized program, the method comprising:
   generating an optimized code segment from a source code segment that accesses a variable having a variable-memory off-set, the variable-memory off-set being unknown at compile time;
   emitting one or more predicated expressions, accessible by a debugger, into the optimized code segment, each predicated expression including one or more simulation state variables; and
   generating an interface that allows the debugger to evaluate and use the simulation state variables to access execution dependent memory information of the variable.

2. The computer-implemented compiler optimization method of claim 1, further comprising allocating a virtual memory address to the variable, wherein the virtual memory address maps a memory address to a cache.

3. The computer-implemented compiler optimization method of claim 1, further comprising inserting a live range statement corresponding to the variable into the optimized code segment, and the live range statement including at least one simulation state variable for the execution dependent memory information.

4. The computer-implemented compiler optimization method of claim 3, further comprising optimizing the optimized program using the live range statement and at least one of the simulation state variables.

5. The computer-implemented compiler optimization method of claim 4, wherein optimizing the program further comprises inserting a first code to query a content addressable memory to determine whether the variable is present in the cache.

6. The computer-implemented compiler optimization method of claim 5, wherein optimizing the program further comprises inserting a second code to load the variable to the cache if the variable is not present therein.

7. The computer-implemented compiler optimization method of claim 2, further comprising maintaining a live range table for the variable.

8. The computer-implemented compiler optimization method of claim 7, further comprising updating the live range table at an execution path if the variable is not present in the cache.

9. A computer-implemented compiler optimization method comprising:
   generating an optimized code segment from a source code segment that accesses a variable having a variable-memory off-set, the variable-memory off-set being unknown at compile time, the optimized code segment allocating a virtual memory address to the variable, the virtual memory address mapping a memory address to a cache, linking the virtual memory address to execution dependent memory information that remains uncertain until program execution.

10. The computer-implemented compiler optimization method of claim 9, further comprising:
    caching the variable based on the virtual memory address mapping;
    maintaining a live range table for the cached variable, the live range table including at least a value for a simulation state variable corresponding to the cached variable, the simulation state variable being defined to certain values with regard to execution of the program;
    updating the simulation state variable corresponding to the cached variable at a preselected execution location of the program; and
    updating the live range table at the preselected execution location.

11. The computer-implemented compiler optimization method of claim 10, wherein the live range table includes a handle and an address of the cached variable.

12. The computer-implemented compiler optimization method of claim 10, further comprising displaying valid data corresponding to the cached variable at the preselected execution location.

13. The computer-implemented compiler optimization method of claim 10, further comprising removing an entry in the live range table if the cached value is not present in the cache.

14. The computer-implemented compiler optimization method of claim 10, further comprising inserting an entry into the live range table if the cached variable is loaded into the cache.

15. A system comprising:
a processor; and
a dynamic random access memory coupled to the processor including instructions that if executed enable the system to:
generate an optimized code segment from a source code segment that accesses a variable having a variable-memory off-set, the variable-memory off-set being unknown at compile time,
emit one or more predicated expressions, accessible by a debugger, into the optimized code segment, each predicated expression including one or more simulation state variables, and
generate an interface that allows the debugger to evaluate and use the simulation state variables to access execution dependent memory information of the variable.

16. The system of claim 15, wherein the optimized code segment allocates a virtual memory address to the variable, and the virtual memory address maps a memory address to a first cache memory.

17. The system of claim 16, wherein the processor includes a second cache memory and a content addressable memory.

18. The system of claim 17, wherein the dynamic random access memory further comprises instructions that if executed enable the system to insert code to load the variable to the second cache memory if the variable is not present therein.

19. The system of claim 17, wherein the dynamic random access memory further comprises instructions that if executed enable the system to insert code to query the content addressable memory to determine whether the variable is present in the second cache memory.

* * * * *